United States Patent [19]

Okumura

[11] Patent Number: 5,122,924

[45] Date of Patent: Jun. 16, 1992

[54] ELECTRONIC COMPONENT HAVING A PLURALITY OF CURRENT PATH PAIRS

[75] Inventor: Mitsunao Okumura, Nagaokakyo, Japan

[73] Assignee: Murata Manufacturing Co., Ltd., Japan

[21] Appl. No.: 446,133

[22] Filed: Dec. 5, 1989

[30] Foreign Application Priority Data

Dec. 5, 1988 [JP] Japan .................. 63-307318
Dec. 26, 1988 [JP] Japan .................. 63-330088

[51] Int. Cl.$^5$ ...................... H01G 4/38; H01B 9/06
[52] U.S. Cl. ............................ 361/330; 174/15.6
[58] Field of Search ............... 361/328, 329, 330; 174/15 C, 15 WF, 32; 219/69 C

[56] References Cited

U.S. PATENT DOCUMENTS

| 248,742 | 10/1881 | Henck ................ 361/330 |
| 1,991,707 | 2/1935 | Silbermann ............ 361/329 |
| 3,617,830 | 11/1971 | Perna ................. 361/329 |
| 4,654,751 | 3/1987 | Tokura et al. ......... 361/328 |

*Primary Examiner*—Donald A. Griffin
*Attorney, Agent, or Firm*—Ostrolenk, Faber, Gerb & Soffen

[57] ABSTRACT

An electronic component includes a plurality of current path pairs which are arranged on the same circle. Currents flow through first current paths forming respective current path pairs in first directions, and currents flow through second current paths in second directions opposite to the first directions. The first current paths and the second current paths are arranged alternately. Therefore, magnetic fields generated by the currents in the first directions and magnetic fields generated by the currents in the second directions are canceled by each other, whereby residual inductance becomes small. In the case where the electronic component is a cable, the current paths are conductors buried in an insulation member. In the case where the electronic component is a capacitor, at least one of the current paths forming the pair is a capacitor unit.

10 Claims, 5 Drawing Sheets

ELECTRONIC COMPONENT HAVING A PLURALITY OF CURRENT PATH PAIRS

BACKGROUND OF THE INVENTION

1. Field of the Invention

The present invention relates to an electronic component having a plurality of current path pairs. More specifically, the present invention relates to a novel electronic component in which a residual inductance is made small by causing magnetic fields generated by opposite currents flowing in respective current path pairs to cancel each other.

2. Description of the Prior Art

In a conventional co-axial cable 1 as shown in FIG. 1, an outer conductor 4 is disposed on an inner conductor 2 via an insulator 3, and a sheath 5 is covered on an outer surface of the outer conductor 4. In the co-axial cable 1, if the cable has an impedance of which is 75 ohms, for example, the residual inductance is 370 nH/m and the capacitance is 70 pF/m, approximately. That is, in such a kind of co-axial cable, the residual inductance L exists, which is represented by the following equation (1) and dependent on a diameter $d_1$ of the inner conductor 2 and a diameter $d_2$ of the outer conductor 4.

$$L = 200 \cdot \log_n d_2/d_1 \ [nH/m] \quad (1)$$

In order to make the residual inductance L small as possible, the assignee of the present invention has proposed a co-axial cable 1' as shown in FIG. 2 in Japanese Utility Model Laid-open No. 63-164115 laid open on Oct. 26, 1988. In this co-axial cable 1', an inner conductor 2' is formed in a hollow cylindrical fashion so that the diameter $d_1$ of the inner conductor 2' is made larger. In the co-axial cable 1', if the cable has an impedance of 7.5 ohms, the residual inductance is 33 nH/m and the capacitance is 570 pF/m, approximately.

In the co-axial cable 1 as shown in FIG. 1, since the ratio of the diameter $d_2$ of the inner conductor 2 to and the diameter $d_1$ of the outer conductor 4 is large, the value of the residual inductance L represented by the equation (1) becomes large. That is, in such a kind of co-axial cable, the value of the residual inductance L = 300–500 nH/m, for example.

On the other hand, in the co-axial cable 1' as shown in FIG. 2, since the diameter $d_1$ is made larger by forming the inner conductor 2 as a hollow cylindrical fashion, it is possible to make the value of the residual inductance smaller; however, there are disadvantages that the withstand voltage is lowered due to reduction of a cubic volume of the insulator 3 and the capacitance becomes larger since the gap between the inner conductor 2' and the outer conductor 4 is small.

SUMMARY OF THE INVENTION

Therefore, a principal object of the present invention is to provide a novel electronic component in which the residual inductance is small.

Another object of the present invention is to provide an electronic component in which the residual inductance is made small by causing magnetic fields generated by currents flowing in opposite directions through a first current path and a second current path to cancel each other.

Another object of the present invention is to provide a cable in which the residual inductance and a capacitance are small.

A further object of the present invention is to provide a capacitor in which a residual inductance is small and thus a frequency characteristic is good.

An electronic component in accordance with the present invention comprises a plurality of current path pairs arranged on substantially the same circle, wherein currents flow in first directions on one current paths forming respective current path pairs and currents flow on the other current paths in second directions opposite to the first directions, whereby magnetic field generated by the currents of first direction and magnetic fields generated by the currents of second directions are canceled with each other.

In accordance with the present invention, since magnetic fields generated by the currents of the first directions and magnetic fields generated by the currents of the second directions are canceled with each other in respective current path pairs, a residual inductance becomes very small.

A cable of one embodiment in accordance with the present invention comprises a hollow or solid insulator, and a plurality of pairs of first conductors and second conductors arranged on the insulator, wherein the first conductors and second conductors are commonly connected to each other at both ends, respectively.

In this embodiment, by using the first conductors as going lines (or returning lines), and the second conductors as returning lines (or going lines), magnetic fields generated around the first conductors and the second conductors are canceled with each other. Therefore, a residual inductance of the cable as a whole becomes very small. In addition, if the cable is required to maintain a higher withstand voltage, distance between the first conductors and second conductors, which affect no influence to the residual inductance value of the cable, may be designed to be larger. In addition, areas of conductors opposite to each other are small in comparison with the co-axial cable, a capacitance also becomes small.

A capacitor of the other embodiment in accordance with the present invention comprises a plurality of current path pairs arranged on substantially the same circle, wherein currents flow in first directions on one current paths constituting respective current pairs and currents flow on the other current paths in second directions opposite to the first directions, and at least one of the current paths of each of the current path pairs is formed by a capacitor unit.

The objects and other objects, features, aspects and advantages of the present invention will become more apparent from the following detailed description of the embodiments of the present invention when taken in conjunction with accompanying drawings.

DETAIL DESCRIPTION OF THE PREFERRED EMBODIMENTS

Figure 3:
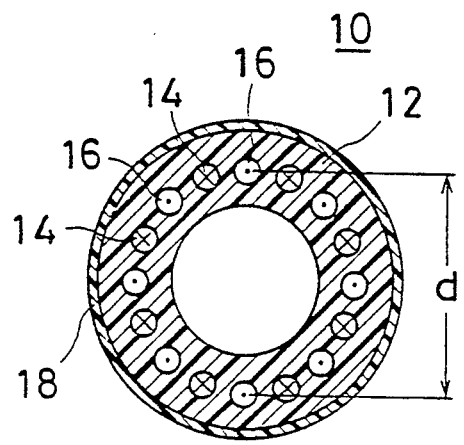
FIG. 3 is a vertical sectional view showing a cable constituting a first embodiment is accordance with the present invention.
Figure 4:
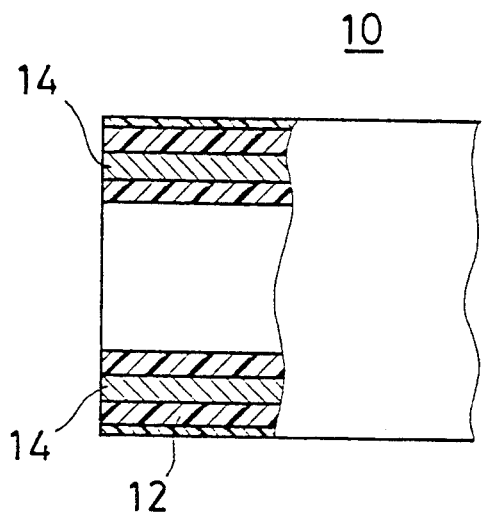
FIG. 4 is a fragmentary longitudinal sectional view showing the FIG. 3 embodiment.

FIG. 3 is a vertical sectional view showing a first embodiment in accordance with the present invention and FIG. 4 is a fragmentary longitudinal sectional view of the FIG. 3 embodiment. A cable 10 in accordance with this embodiment shown includes an insulator 12 formed in a hollow cylindrical fashion of a synthetic resin, for example. Within the insulator 12, a plurality of pairs (8 pairs in this embodiment) of first conductors 14 and second conductors 16 are alternately disposed in a circle. The first conductors 14 and second conductors 16 may be the same conductors, but, in the case where the first conductors 16 are used as out going lines, for example, the second conductors 16 are used as returning lines, and therefore, in FIG. 3, in order to distinguish the both, "x" is marked in a cross-section of each of the first conductors 14 and "·" is marked on a cross-section of each of the second conductors 16.

In addition, within the insulator 12, the first conductors 14 and the second conductors 16 are disposed separated by the same intervals on the same circle defined by a diameter d.

Figure 5:
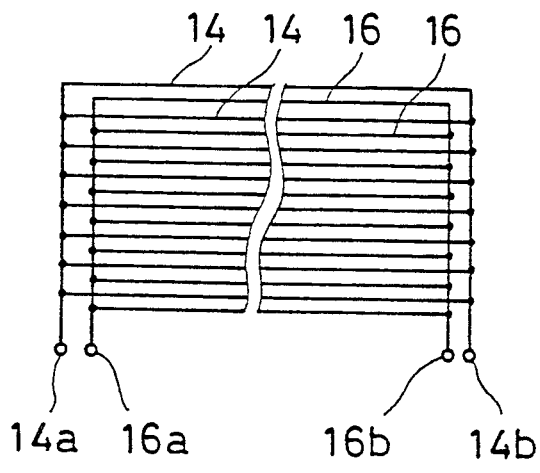
FIG. 5 is an illustrative view showing first conductors and second conductors commonly connected, in the FIG. 3 embodiment.

Then, at both ends of the cable 10, i.e., the insulator 12, as shown in FIG. 5, the first conductors 14 and the second conductors 16 are commonly connected to terminals $14a$, $14b$ and $16a$, $16b$, respectively. Then, if the first conductors 14 and the second conductors 16 are used as the going lines and returning lines, respectively, magnetic fields generated around the first conductors 14 can be completely canceled by magnetic fields generated around the second conductors 16.

In addition, as shown in FIG. 3, on an outer surface of the insulator 12, an insulation sheath 18 composed of a synthetic resin, for example, may be formed to protect the insulator 12.

In the cable 10 of the FIG. 3 embodiment, since the first conductors 14 and the second conductors 16 are disposed on the circles of the same diameter d, in aforementioned equation (1) representative of the residual inductance L, the diameter d becomes equal to the diameters $d_1$ and $d_2$ ($d = d_1 = d_2$). Resultingly, $\log_n d_2/d_1 = 0$ is obtained in the equation (1), whereby the value of the residual inductance becomes $L = 0$, theoretically.

Figure 1:
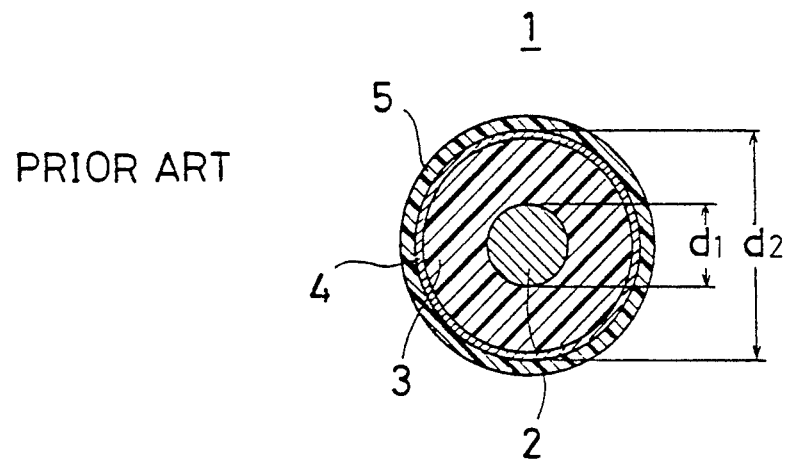
FIG. 1 and FIG. 2 are vertical sectional views respectively showing conventional co-axial cables.
Figure 2:
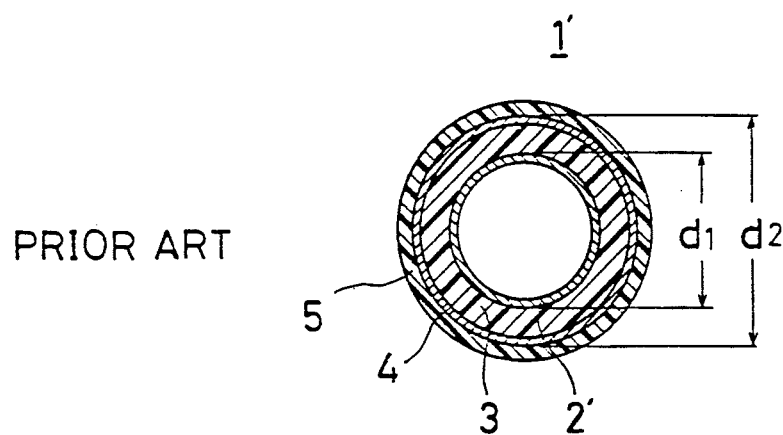

Actually, in accordance with working accuracy or the like a residual inductance of approximately 3 nH/m occurs and the capacitance becomes $C = 100–200$ pF. Thus, in the cable 10 of the FIG. 3 embodiment, the residual inductance becomes very small in comparison with conventional cables as shown in FIG. 1 and FIG. 2.

In the case where the cable 10 of the FIG. 3 embodiment is utilized as a communication cable, if the first conductors 14 are used as hot lines, for example, the second conductors 16 are used as cold lines. In this case, since the residual inductance is very small, no deterioration of the high-frequency transmitting characteristic occurs and thus it is possible to make the transmission frequency band wider. In addition, since the first conductors 14 are electromagnetically shielded by the second conductors 16, the same are affected little by the influence of an external noise and little spurious radiation occurs to the outside.

In addition, since the insulator 12 of the cable 10 is formed as a hollow cylinder, it is possible to insert a cable having a smaller diameter into the hollow portion thereof. Then, if the cable having a smaller diameter is one having the same structure as the cable 10, by commonly connecting the first conductors 14 and the second conductors 16, respectively, it is possible to increase the current capacity and it is possible to further reduce the residual inductance, in comparison with a cable in which no cable is inserted into the hollow portion. Additionally, in such a multi-layered structure, the number of layers may be arbitrary as possible.

Figure 6:
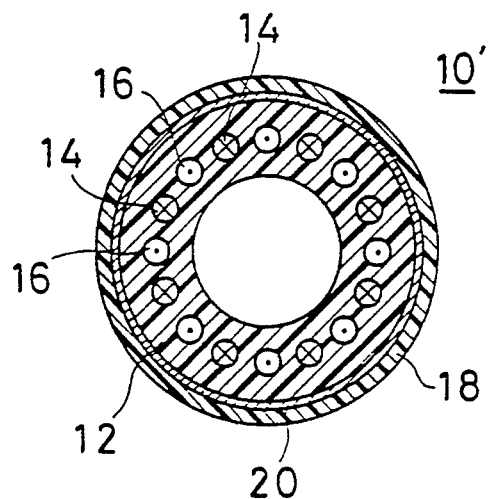
FIG. 6 is a vertical sectional view showing a cable constituting a second embodiment in accordance with the present invention.

FIG. 6 is a vertical sectional view showing a cable according to a second embodiment in accordance with the present invention. In a cable 10' of this embodiment shown, a metallic sheath 20 is formed between the insulator 12 and the insulation sheath 18. Therefore, in the case where the cable 10' is used as a communication cable, the second conductors 16 which serve as cold lines are connected to the metallic sheath 20.

In addition, in the case where the cable 10' as shown in FIG. 6 is used as a power cable, in a single-phase three-wire system, for example, a neutral wire which is a grounding wire is connected to the metallic sheath 20. Then, one non-grounding wire is connected to the first conductors 14 and the other non-grounding wire is connected to the second conductors 16. By connecting in such a manner, since the cable 10' is completely shielded by the metallic sheath 20, even if AC currents of 50 Hz or 60 Hz flow through the first conductors 14 and the second conductors 16, no induced electromotive force due to electromagnetic induction occurs in any signal line, for example, which may be arranged closely to the cable 10'. that is, in the case where the cable 10' of FIG. 6 embodiment is utilized as a power cable, no induction interference occurs.

Figure 7:
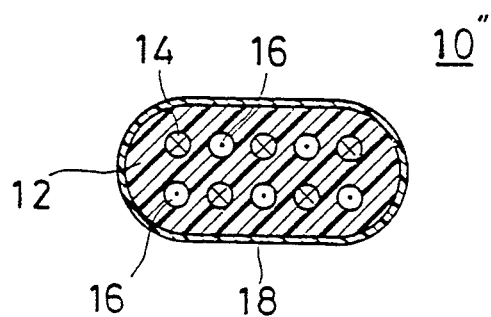
FIG. 7 is a vertical sectional view showing a cable constituting a third embodiment in accordance with the present invention.

A cable 10" as shown in FIG. 7 is capable of being used as an interior or domestic cable, for example, and the first conductors 14 and the second conductors 16 are disposed in parallel with each other. Therefore, since a relationship of $d = d_1 = d_2$ cannot be established, the residual inductance becomes larger than in the previous embodiment, but it is possible to reduce the residual inductance by canceling the magnetic fields as generated.

In addition, in the first and second described embodiments, the insulator 12 is formed as a hollow cylinder. However, the cross-sectional form of the insulator 12 need not be a circle, but may be rectangular or a flat oval as shown in FIG. 7. Furthermore, it is not necessary for the insulator 12 to be a hollow member, but rather it may be a solid cylinder, a bar-like member or the like.

In addition, in the first and second described embodiments, the cross-sectional arrangement of the first conductors 14 and the second conductors 16 disposed in the insulator 12 is a circle, but in addition such a conductor may be a rectangular shape in cross-section, a plate-like member, a foil or the like. In the case where the first conductors 14 and the second conductors 16 are formed as foil conductors, it is possible to form the individual conductors by forming slits in a longitudinal direction by laser working, for example, after a conductive foil has been formed on the whole surface of the insulator 12.

Furthermore, the number of pairs of the first conductors 14 and the second conductors 16 disposed in the insulator 12 need not be eight and may be two or more. Also, the number of layers or columns need not be one as shown in FIG. 3 or FIG. 6, but may be plural, disposed on concentric circles.

Figure 8:
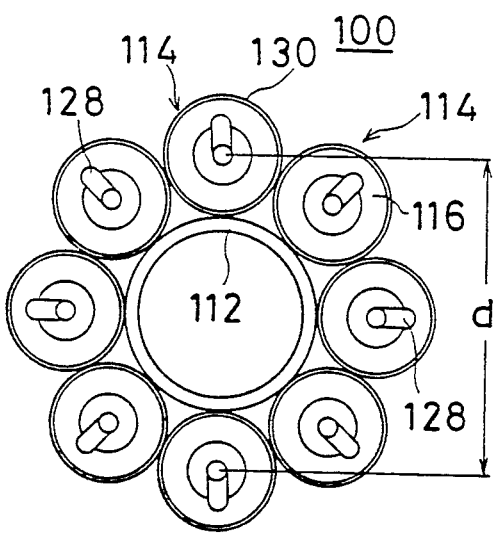
FIG. 8 is a side elevational view showing a capacitor constituting a fourth embodiment in accordance with the present invention.
Figure 9:
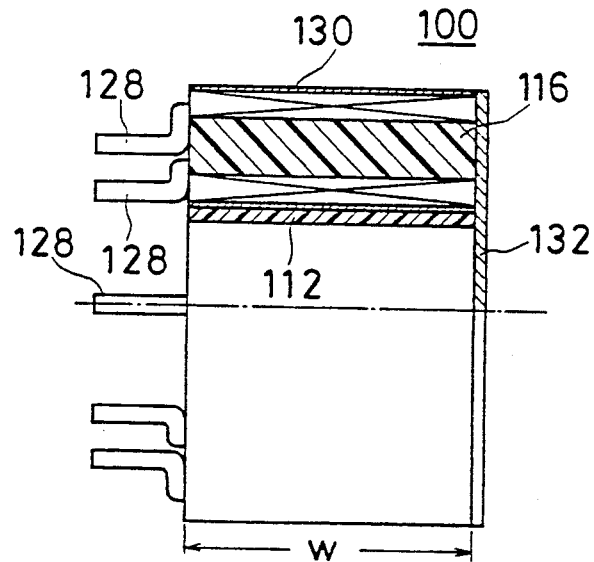
FIG. 9 is a longitudinal sectional view showing the FIG. 8 embodiment.

FIG. 8 is a side elevational view showing a capacitor according to a fourth embodiment of the present invention, and FIG. 9 is a longitudinal sectional view of FIG. 8. The capacitor 100 of this embodiment shown includes a cylinder 112 composed of insulation materials such as a synthetic resin. On outer surface of the cylinder 112, an even number of (8 in this embodiment shown) circular cylinder-like capacitor units 114 are disposed. That is, the capacitor units 114 are disposed in a circle of diameter d and the cylinder 112 is at the central thereof.

Figure 12:
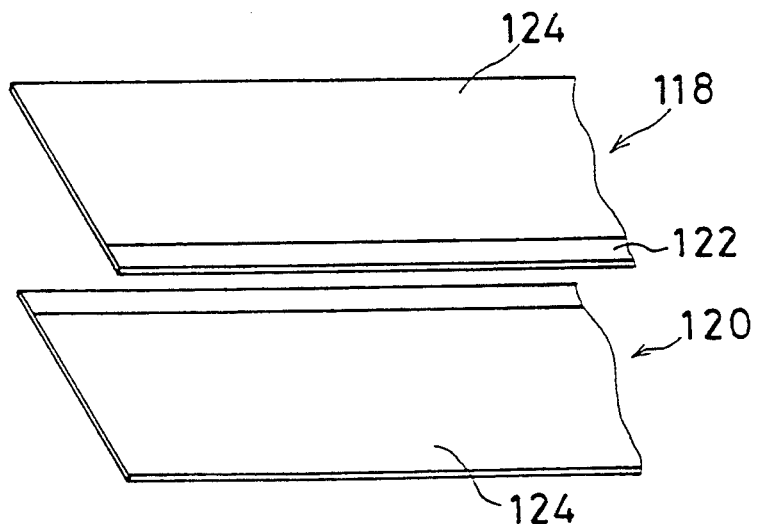
FIG. 12 is a perspective view showing film sheets utilized in the FIG. 8 embodiment.

Each of the capacitor units 114 is formed by winding film sheets 118 and 120 as shown in FIG. 12 on a winding core 116 made of insulation materials. The film sheets 118 and 120 have predetermined dielectric constants so as to function as dielectric material of the capacitor unit 114. Then, on the top surfaces of the film sheets 118 and 124, electrodes 120 are formed, respectively, while margins 122 are alternately remained. Each of the electrodes 124 may be formed by adhesion of a metallic foil such as an aluminum, or vapor deposition or sputtering of aluminum, for example. Then, although not shown, after winding the film sheets 118 and 120, both end thereof are metallized to form external electrodes.

On a side surface of each of the capacitor units 114, a conductor 130 is formed as shown in FIG. 8 and FIG. 9.

A disc-like short-circuiting plate 132 is fixed to a first end surface of the cylinder 112 (toward the right in FIG. 9). Then, although not clearly seen from FIG. 9, first terminals 128 of the capacitor units 114 are commonly connected to the short-circuiting plate 132.

Second terminals 128 of the capacitor units 114 are respectively bent and arranged at a center of the insulator 116.

Figure 10:
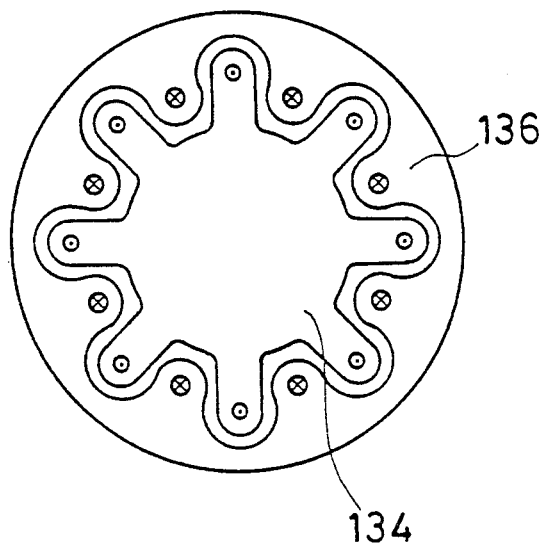
FIG. 10 is a top plan view showing one example of a terminal board.

To a left second end surface (toward the left in FIG. 9) of the capacitor 100 being thus formed, two sheets forming terminal plates 134 and 136 as shown in FIG. 10 are fixed.

Eight terminals 128 being projected from the left side end surface are commonly connected to each other by the terminal plate 134. More specifically, the terminal plate 134 is formed as a gear form, approximately, in which concave portions and convex portions are alternately arranged, and at positions of the convex portions corresponding to the terminals 128, holes for inserting the terminals 128 are formed. In FIG. 10, at the positions where the holes are to be formed, signs "." showing a direction of current flow are attached.

On the other hand, the conductors 130 of all the capacitor units 114 are commonly connected to each other by the terminal plate 136. More specifically, in the terminal plate 136, in order to endure its insulation from the terminal plate 134, convex portions and concave portions are formed to be separated from the concave portions and convex portions of the terminal plate 134 by a predetermined distance. Then, the convex portions of the terminal plate 136 are arranged at positions where the conductors 130 are in contact with each other. In FIG. 10, signs "x" showing the direction of the current flow are attached at those positions.

Figure 11:
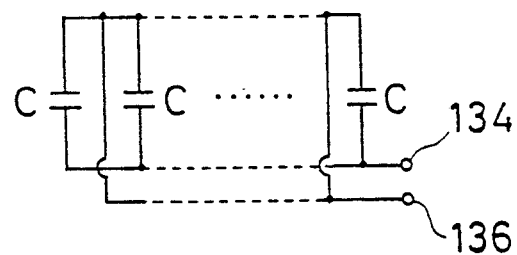
FIG. 11 is a circuit diagram showing the FIG. 8 embodiment mounted on a terminal board as shown in FIG. 10.

In this embodiment, if the current flows into the terminal plate 136, the current flows through the conductors 130 of the respective capacitor units 114 to reach the short-circuiting plate 132. Thereafter, the current flows between the electrodes 124 (FIG. 12) of the capacitor units 114, to be gathered on the terminal plate 134. Therefore, this embodiment has a configuration having electrostatic capacitance C of the same number as the number of the capacitor units 114, as shown in the circuit diagram of FIG. 11.

In addition, in the FIG. 8 embodiment, air gaps are formed between the respective capacitor units 114, but as necessary, the air gaps may be filled by insulators so that the capacitors can be formed approximately in the shape of a cylindrical post as a whole.

In such a capacitor 100, the average diameters of the current paths flowing into the capacitor units 114 and the current paths flowing out of the capacitor units 114 become d, respectively. That is, in the case where the current flows into the terminal plate 136, the current flows through the conductors 130 of the respective capacitor units 114. Therefore, the average diameter of such current paths is d. On the other hand, in such a capacitor, if the width of the capacitor units 114 is W, the residual inductance L is given by the following equation (2).

$$L = 200 \cdot W \cdot \log_n d_2/d_1 \tag{2}$$

Then, in this embodiment shown, since the respective capacitor units 114 are arranged on the circle of the diameter d, each of the average diameters of the paths of the currents which flow within the capacitor unit 114 and reach the terminals 128 is d. Therefore, in the equation (2) indicated above, $d_1 = d_2$, and thus $\log_n d_2/d_1 = 0$, and therefore, the residual inductance becomes $L = 0$, theoretically.

In fact, due to working accuracy and so on, the residual inductance becomes 1 nH. However, such a value is very small in comparison with that of a conventional one, and therefore, it is possible to use the capacitor 100 in a high-frequency region.

Figure 13:
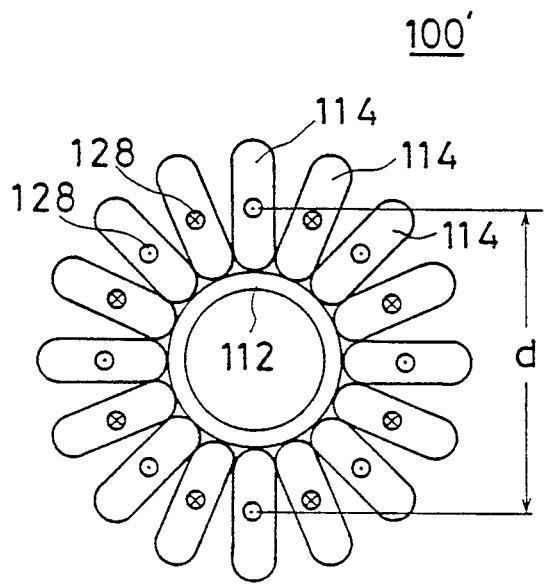
FIG. 13 is a side elevational view showing a capacitor constituting a fifth embodiment in accordance with the present invention.
Figure 14:
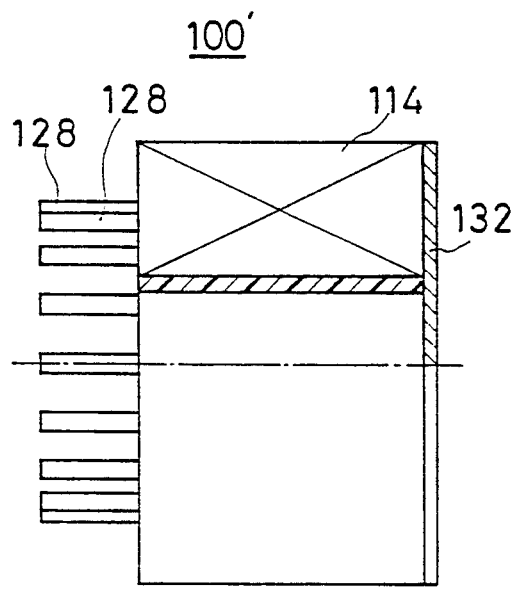
FIG. 14 is a longitudinal sectional view showing the FIG. 13 embodiment.

FIG. 13 and FIG. 14 are respectively side views and a longitudinal sectional view showing a capacitor as another embodiment in accordance with the present invention. In a capacitor 100' of this embodiment shown, sixteen capacitor units 114 are arranged on the same circle of a diameter d on the cylinder 112. Each of the capacitor units 114 is not a circular cylinder form and is formed in a flat plate form. Then, all the capacitor units 114 are the same as each other, but since directions that currents flow therein are reversed to each other, as shown in FIG. 13, signs "." and "X" are attached on the end surface of the terminal 128.

Figure 15:
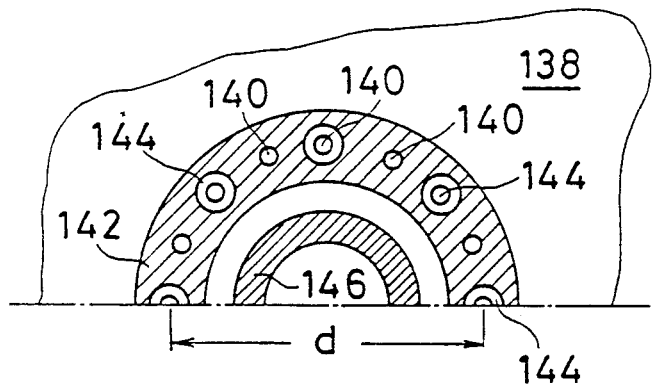
FIG. 15 is a top plan view showing a printed circuit board for mounting a capacitor of the FIG. 13 embodiment.
Figure 16:
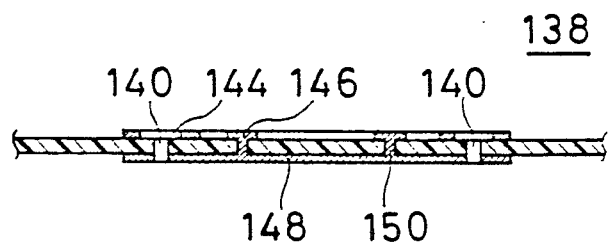
FIG. 16 is a vertical sectional view showing the FIG. 15 printed circuit board.

The capacitor 100' is directly mounted onto a printed circuit board 138, a top plan view and a sectional view of which are respectively shown in FIG. 15 and FIG. 16. In the printed circuit board 138, holes 140 for inserting the terminals 128 are formed on the circle of the diameter d, that is, the same circle as the terminals 128. Then, on a surface of the printed circuit board 138, a ring-like ground patterns 142 is formed. Islands 144 where no ground patterns are formed around alternate holes 140 within the ground pattern 142 to ensure the insulation between the terminals 128 indicated by the signs ".". The terminals 128 indicated by the signs "x" are inserted in the holes 140 having no islands 144 and soldered to the ground pattern.

On the surface of the printed circuit board 138, a ring-like hot pattern 146 having a diameter smaller than that of the ground pattern 142 is formed.

On a rear surface of the printed circuit board 138, as shown in FIG. 16, a hot pattern 148 having approximately the same diameter as that of the ground pattern 142 is formed. The terminals 128 which are projected on the rear surface to be insulated by the islands 144 are soldered to the hot pattern 148. The hot pattern 148 and the hot pattern 146 formed on the top surface are connected to each other by throughhole conductors 150. Therefore, the current of the hot pattern 146 flows from the hot pattern 148 of the rear surface through half of the number of the capacitor units 114, and the current is turned by the short-circuiting plate 132 and flows through the remaining half of the number of the capacitor units 114 to reach the ground pattern 142.

In the capacitor 100' of this embodiment shown, the average diameters d of the flowing-in currents and flowing-out currents of the capacitor units 114 become equal to each other, and therefore, similarly to the previous embodiment, the value of the residual inductance becomes $L=0$, theoretically.

In addition, in the embodiments shown in FIG. 8-FIG. 16, the number of pairs of the current paths may be an arbitrary number of pairs more than two.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cable, comprising:
   an insulator of a hollow or solid material; a plurality of pairs of first conductors and second conductors arranged on said insulator, said first conductors being connected in parallel with each other, and said second conductors being connected in parallel with each other; and
   a shielding conductor formed outside of said first conductors and second conductors.

2. A cable in accordance with claim 1, wherein said shielding conductor is connected to said first conductors or said second conductors.

3. A cable in accordance with claim 1, wherein said first conductors and said second conductors are alternately arranged.

4. A capacitor comprising:
   a plurality of pairs of first and second direction current paths arranged in substantially a circle, at least one of the current paths constituting each of said pairs being a capacitor unit;
   first connecting means for commonly connecting first ends of said first direction current paths and said second direction current paths;
   second connecting means for commonly connecting the other ends of said first direction current paths to each other; and
   third connecting means for commonly connecting the other ends of said second direction current paths to each other.

5. A capacitor in accordance with claim 4, wherein said first direction current paths and said second direction current paths are alternately arranged.

6. A capacitor in accordance with claim 5, wherein said capacitor units include wound units of insulation sheet.

7. A capacitor in accordance with claim 5, wherein said first connecting means includes a plate-like electrode fixed on one end surface of said capacitor units.

8. A capacitor in accordance with claim 7, wherein said second connecting means and said third connecting means include individual electrodes fixed on the other end surfaces of said capacitor units.

9. An electronic component comprising a plurality of current path pairs arranged substantially in a circle, wherein each of said current path pairs is provided by a pair of conductors which are effectively insulated and disconnected from each other at both ends thereof, wherein a current flows through one current path of each of said current path pairs in a first direction, a current flows through the other current path in a second direction opposite to the first direction, and said one current path and said other current path are alternately arranged so that a magnetic field generated by the current of the first direction and a magnetic field generated by the current of the second direction cancel each other.

10. An electronic component, comprising a plurality of current path pairs arranged substantially in a circle, wherein at least one of the current paths of each of said current path pairs is formed by a capacitor unit, a current flows through one current path of each of said current path pairs in a first direction, a current flows through the other current path in a second direction opposite to the first direction, and said one current path and said other current path are alternately arranged so that a magnetic field generated by the current of the first direction and a magnetic field generated by the current of the second direction cancel each other.

* * * * *